June 4, 1957 J. H. THOMPSON ET AL 2,794,948

PHASE SHIFTING CIRCUIT

Filed June 20, 1956

INVENTORS.
JOHN H. THOMPSON
ROBERT H. WHITTAKER
BY
ATTORNEYS.

United States Patent Office 2,794,948

Patented June 4, 1957

2,794,948

PHASE SHIFTING CIRCUIT

John H. Thompson, Pittsburgh, and Robert H. Whittaker, Export, Pa., assignors, by mesne assignments, to the United States of America as represented by the Secretary of the Navy Application June 20, 1956, Serial No. 592,699

4 Claims. (Cl. 323—122)

Figures 1, 2:
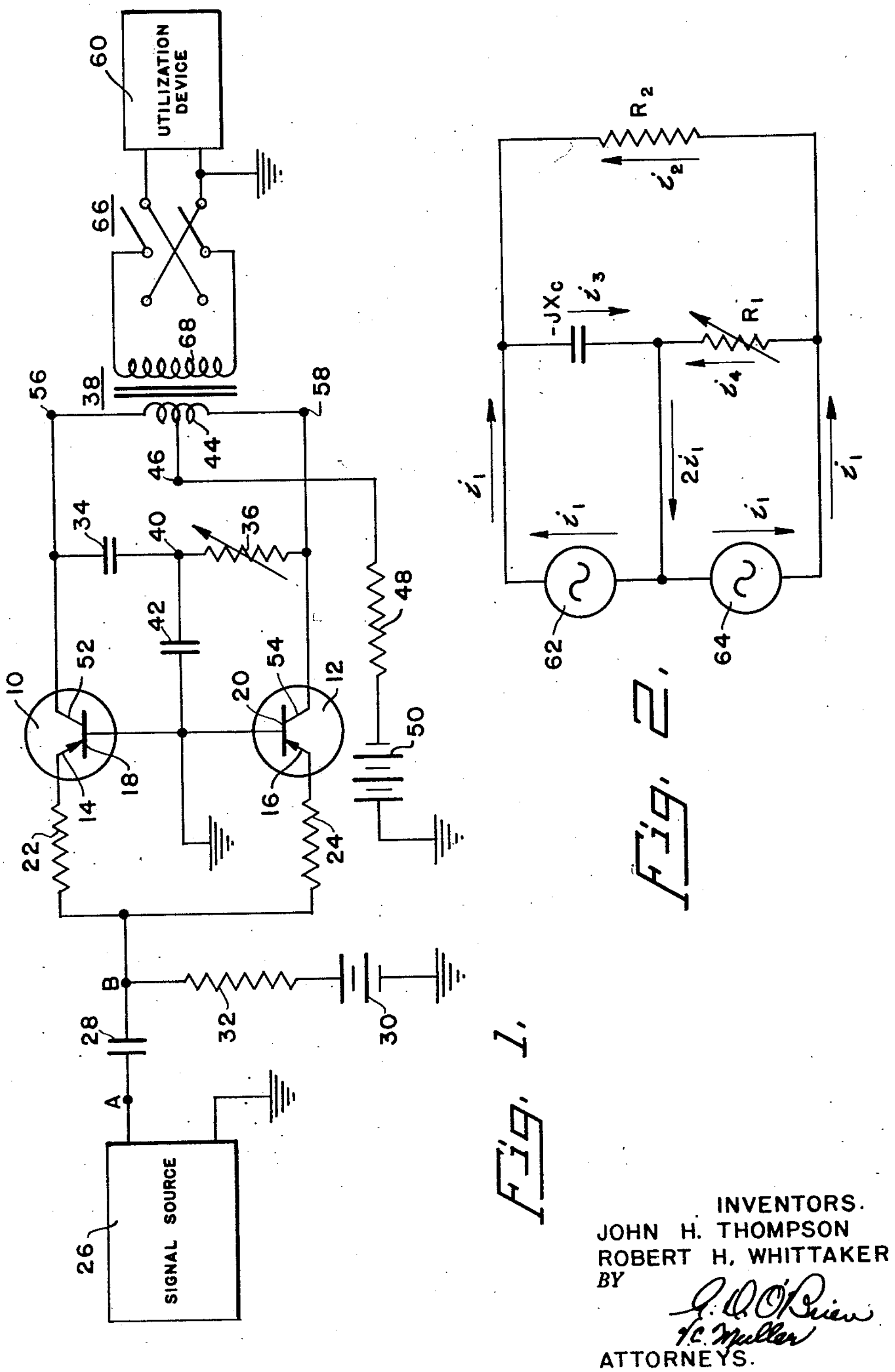

The present invention relates to phase shifters, and more particularly to electrical phase shifting networks adapted for operation at relatively low impedance levels such as characterize transistor circuits.

When suitably accomplished, transistorization of electronic circuits normally employing vacuum tubes offers the very definite advantages, among others, of reduction in size, in weight, in developed heat, and in power requirements, and these are of particular importance in certain military equipment such as guided missiles and torpedoes. Many vacuum tube circuits which are adapted to perform various functions as needed in such equipment have therefore been modified to be suitable for use with transistors, principally by application of known conversion techniques.

However, it has been found that conventional phase shifting circuits in particular cannot be satisfactorily carried over directly for utilization with transistors, nor by any obvious application of known duality techniques. In general, simple modifications or conversions are unsatisfactory because the low impedances presented by transistors unduly disturb the operating characteristics of the conventional phase shifting networks, these networks having been especially devised for use with vacuum tubes characterized by operation at high impedance levels, and because many such conversions may result in configurations and complexities which defeat the very purpose of transistorization.

It is therefore a principal object of the present invention to provide a phase shifting network suitable for low impedance utilization circuits.

It is another object of the present invention to provide a phase shifting circuit arrangement especially adapted for use in compact transistorized equipment.

It is a further object of the present invention to provide a low impedance type of phase shifting circuit which supplies a phase shifted output current or voltage of substantially constant magnitude.

Other objects and many of the attendant advantages of this invention will be readily appreciated as the same becomes better understood by reference to the following detailed description when considered in connection with the accompanying drawings wherein:

Fig. 1 is a circuit schematic illustrating a preferred simplified embodiment of the novel phase shifting network; and Fig. 2 is an equivalent circuit schematic which, with later discussion, may be helpful in providing a better understanding of the basic principles of operation of the present invention.

Phase shifters are generally of two distinct types, one making use of the principle of E. M. F. induction in a stationary coil which is adjustable to various orientations in a rotating magnetic field, the other utilizing the 90° phase difference between current through and voltage across reactive elements in electronic circuits. The present invention provides a phase shifter of the latter type in a novel circuit arrangement especially adapted for use at low impedance levels, as will appear.

Where it is desired that the output A.-C. voltage or current of a phase shifter shall be of constant amplitude and, as in the novel phase shifter to be described, continuously variable between substantially 0° and 180° in phase relative to an input A.-C. voltage or current, the circuits most commonly employed with vacuum tubes are based upon a bridge-type phase-shifting network which in practice comprises a capacitor and an adjustable resistor in a series combination to which an input A.-C. voltage is applied, and a parallel circuit which center-taps the input voltage. In such a network, the phase-shifted voltage appears between the center-tap and the junction between the capacitor and variable resistor.

The phase shifter provided by the present invention also employs resistive and reactive elements, but in a circuit arrangement quite unlike that outlined above, and which provides operational characteristics especially favorable for use with transistors. The resistive and reactive elements in this novel arrangement separately form individual loads in a pair of transistor circuits which function as constant current amplifiers. As seen from the load termination, these elements can be regarded as forming a series combination, which is shunted by a low-impedance load as presented thereto through the conversion action of a coupling transformer connected to the actual utilization device. Variations in magnitude of either the resistance in the one transistor circuit or the reactance in the other transistor circuit will not affect the total currents delivered by the transistor devices, but will nevertheless result in such changes in the component currents as to yield the desired substantially constant amplitude and phase shifted output current and voltage.

Referring now to Fig. 1 which illustrate a typical circuit embodiment of the present invention, 10 and 12 designate transistors which are here shown as of P–N–P type, so identifiable for example by the positive bias voltage applied to emitter electrodes 14 and 16 relative to the base electrodes 18 and 20. Resistors 22 and 24 connected between the emitter electrodes and signal source 26 are substantially equal and several orders of magnitude larger than the input resistances of the transistors. For a given signal voltage applied to point B relative to the voltage reference point (ground), resistors 22 and 24 thus serve to constrain the input driving currents of the two transistors 10 and 12 to substantially fixed R. M. S. (root mean square) magnitudes, regardless of any variations in the output circuits, and the output currents of the two transistors are correspondingly also of fixed and equal magnitudes. Signal source 26 is coupled to resistors 22 and 24 by means of a capacitor 28 which presents low impedance at the operating frequency. Coupling capacitor 28 also serves to effectively block any current from being taken by signal source 26 from the D.-C. biasing source 30. Resistor 32 is of large ohmic value to present an A.-C. impedance so much greater than that of capacitor 28 as to insure that nearly the same A.-C. voltage is communicated to point B as is presented by signal source 26 to point A. Resistor 32 also serves to limit the D.-C. emitter current drawn from biasing source 30, and the current drawn by resistor 32 from signal source 26. The base electrodes 18 and 20 are connected to the common reference point (ground) to complete D.-C. and A.-C. circuits of the phase shifting arrangement. The phase shifting elements per se are provided by capacitor 34, variable resistor 36, and the equivalent shunting load coupled across the series combination of capacitor 34 and resistor 36 by means of transformer 38. Capacitor 34 and resistor 36 serve as individual load elements for transistors 10 and 12, respectively, the junction point 40 of these load elements being substantially at the zero signal potential of the transistor base electrodes 18 and 20 because of its connection thereto by means of a suitable capacitor 42. Primary 44 of transformer 38 is provided with a center-tap connection at 46 to which the collector-base biasing voltage is applied through resistor 48. Resistor 48 and biasing source 50 are suitably proportioned to limit the collector biasing current to a suitable value, and to present an impedance large enough to prevent conduction of significant signal currents therethrough. D.-C. biasing source 50 thus supplies current to the collector electrodes 52 and 54 of transistors 10 and 12, respectively, through the two halves of transformer primary 44, without in any way disturbing the current or voltage relationships in the phase shifting circuit, the latter including the effective load presented at the transformer primary terminals 56 and 58.

Utilization device 60 may be a transistorized circuit operating at relatively low impedance levels, coupled across the series combination of capacitor 34 and resistor 36 by means of the transformer 38, as indicated. Transformer 38 may be suitably selected or designed so that the equivalent load, as coupled back from the utilization device 60 to terminals 56 and 58, appears as an impedance which is essentially resistive and of considerably smaller magnitude than the impedance of capacitor 34 and resistor 36. At the same time, the output impedance of transformer 38 is made to appear larger than the load resistance presented by utilization device 60, and transformer 38 may therefore be regarded as effectively a current driving source relative to the utilization device 60.

The transistors 10 and 12 in the above described phase shifting circuit function principally as part of an A.-C. generator system which provides constant current to a low-impedance phase shifting network, in such manner that the transistors may themselves effectively be regarded as constant current generators. Of the several transistor connections which can be employed to implement the present invention, the grounded base type of circuit as here shown is preferred because it provides higher transistor output impedance. In this circuit, the principal limiting factor is the capacitive reactance existing between the collector and base electrodes, which at certain frequencies may tend to reduce the effectiveness of the transistors as current generators relative to the phase shifting network in their output circuits. However, the capacitive reactance may easily be compensated over a restricted frequency range, predetermined in accordance with a desired application of the phase shifting device, by selection or design or transformer 38 to make its open circuit inductance of suitable value to provide parallel resonance in the collector-to-collector circuit.

The illustrated arrangement employing the grounded base type of transistor circuit also serves to provide optimum stability. The several currents (A.-C.) in the grounded-base type of circuit are related by the equation:

$$i_c = i_{co} + \alpha i_e \qquad (1)$$

where $i_c$ is the collector current during operation, $i_{co}$ is the collector current for an open circuit condition of the emitter circuit, $i_e$ is the emitter current, and $\alpha$ is the current amplification factor (the ratio, at constant collector voltage, of collector current change to emitter current change). It should be noted that such instability of collector current $i_c$ that may tend to take place due to variations in the term $i_{co}$ is not increased by any multiplying factor. The circuit is therefore essentially immune to the effects of variation in all transistor parameters except alpha ($\alpha$), this immunity being of importance where the phase shifter is to be used in environments where the ambient temperature may vary over a wide range.

The operation of the phase shifting circuit can perhaps best be explained and understood by use of an equivalent circuit diagram and a simplified mathematical analysis. Since the transistors and associated limiting resistors function to deliver constant current regardless of output circuit impedance variations, the equivalent circuit given in Fig. 2 shows the phase shifting and load circuit as energized by constant current generators 62 and 64. Also, since the input circuit to the transistors employs equal resistances 22, 24 as shown in Fig. 1 and discussed above, the current generators 62, 64 provide substantially equal and equally phased currents $i_1$ to the combination of phase shifting elements. The resistive element $R_2$ represents the effective load shunted across the series combination of the capacitive and resistive elements by the conversion action of transformer 38. Variable resistance 36 and capacitor 34 are here identified by the impedance terms $R_1$ and $-jX_c$, respectively, in accordance with conventional symbolic notation and for convenience of mathematical manipulation. The directions of the current $i_1$, $i_2$, $i_3$ and $i_4$ in the several paths as shown in Fig. 2 are to be understood as given simply for convenience in setting up consistent current and voltage relationships. The voltage conditions in the loop circuit of the phase shifting elements must thus satisfy the equation:

$$R_1 i_4 + jX_c i_3 - R_2 i_2 = 0 \qquad (2)$$

and consistent current relationships must satisfy the equations:

$$i_4 = i_1 - i_2 \qquad (3)$$

and $$i_3 = i_1 + i_2 \qquad (4)$$

Substituting (3) and (4) in (2), and combining and factoring, $$i_2(-R_1 + jX_c - R_2) + i_1(R_1 + jX_c) = 0 \qquad (5)$$

It has already been mentioned that the equivalent load resistance $R_2$ is made quite small as compared to the impedances $jX_c$ and $R_1$ of the phase shifting elements 34 and 36, respectively. For present purposes, therefore, $R_2$ may be eliminated from the first summation term in Equation 5, giving $$i_2(jX_c - R_1) = -i_1(R_1 + jX_c) \qquad (6)$$

and yielding $$i_2 = \frac{R_1 + jX_c}{R_1 - jX_c} i_1 \qquad (7)$$

The multiplying factor of $i_1$ is thus a complex vector which determines the magnitude of $i_2$ and the extent of phase shift between currents $i_1$ and $i_2$. Converting Equation 7 to express $i_2$ as a vector summation of its real and imaginary components, $$i_2 = \frac{R^2 - X^2}{R^2 + X^2} i_1 + j \frac{2RX}{R^2 + X^2} i_1 \qquad (8)$$

It can readily be shown that the resultant magnitude of the operator by which current $i_1$ is multiplied, namely the square root of the sum of the squares of the multiplying factors in Equation 8, is equal to unity. This makes it apparent that the multiplying factor in Equation 6 is a unit complex vector, and that for the assumed conditions $i_1$ and $i_2$ are always substantially equal in magnitude. Since current $i_1$ is of fixed and constant magnitude as predetermined by the input parameters, $i_2$ is substantially fixed and constant as to magnitude despite any variations in variable resistor 36. Further, for the current and voltage relationships shown by the arrows in Fig. 2, indicative simply of the so-called directions in which currents and voltages would be measured or utilized, load current $i_2$ leads the equivalent generator current $i_1$, and the phase angle is readily shown to be defined by the equation $$\theta = \text{arc tan}\ \frac{2RX}{R^2 - X^2} \qquad (9)$$

It should now be apparent from Equation 9 that the phase angle $\theta$ is continuously adjustable between theoretically zero and $\pi$ radians by means of variable resistor 36, phase angle $\theta$ in this instance being $\pi$ radians at zero value of resistor 36, and substantially zero at a large value of resistor 36. It may be noted at this point that resistive element 36 may be suitably selected or designed to provide a straight-line calibration or any other desired characteristic, or that a tap-switch arrangement may be provided where predetermined discrete step-changes in phase shift are desired rather than continuous adjustability.

It should now also be apparent that for a fixed voltage applied by signal source 26 to the transistor input circuit, the voltage developed across the equivalent load resistance $R_2$ in Fig. 2, and therefore also the voltage applied to the utilization device 60, remain substantially constant as to magnitudes, but variable in phase relative to the signal voltage, substantially in accordance with the phase relationship of currents $i_1$ and $i_2$ as derived above. The actual phase angle between the input signal current and output load current, and therefore also between the input signal voltage and output load voltage, will differ by a small amount from phase angle $\theta$ as above derived, namely by a correction factor corresponding to the angle of lag of collector current $i_1$ relative to the emitter current. Additionally, 180° phase inversion may be imposed by reversing a pair of connections in the circuit, here accomplished by means of a reversing switch 66 connected between the utilization device 60 and secondary 68 of transformer 38, and this may of course also serve as means for obtaining substantially complete coverage of a full 360° phase shifting range.

It is to be understood that other circuit elements and arrangements may be employed without departing from the basic concepts inherent to the above-described phase-shifting apparatus. For example, an inductive element may be employed in lieu of capacitor 34, in which case the phase shift will be of opposite sense for the same circuit conditions. In general, however, a capacitive element as shown is preferable because it does not create troublesome external fields, presents a higher Q factor, and especially at the lower frequencies is considerably smaller as to physical size. Again, limiting resistor 48 can be replaced by an inductive element to permit reduction of the terminal voltage required of biasing source 50. As to circuitry, the basic phase-shifting network per se can readily be employed in association with other circuits and other types of amplifiers, although perhaps not as conveniently and efficiently.

Obviously many modifications and variations of the present invention are thus possible in the light of the above teachings. It is therefore to be understood that within the scope of the appended claims the invention may be practiced otherwise than as specifically described.

What is claimed is:

1. A network for converting an input signal of predetermined frequency to a phase-shifted output signal of like frequency, said network comprising a reactive element and a resistive element serially connected to provide a junction therebetween and a pair of outer terminals, one of said elements being adjustable as to impedance value, said junction serving as an input signal reference terminal, a substantially resistive circuit bridging said outer terminals and presenting low impedance thereto relative to said reactive and resistive elements, a pair of transfer means having like characteristics and adapted to limit input signals, as applied therefrom to said outer terminals, to substantially equi-phased currents having equal and constant R. M. S. values, whereby the output signal developed in said bridging circuit is of constant R. M. S. magnitude but adjustable as to phase in accordance with the setting of said adjustable element.

2. A network as defined in claim 1, wherein said reactive element is a capacitor, and wherein said resistive element is adjustable as to impedance value.

3. A network as defined in claim 1, wherein said transfer means are transistor devices having signal-current controlling resistors in their input circuits.

4. A network as defined in claim 1, wherein said bridging circuit comprises a utilization device coupled to said outer terminals through transformer means.

No references cited.